E. L. DODSON.
ROTARY DISPLAY DEVICE FOR AUTOMOBILES AND THE LIKE.
APPLICATION FILED OCT. 1, 1917.
1,258,541.
Patented Mar. 5, 1918.
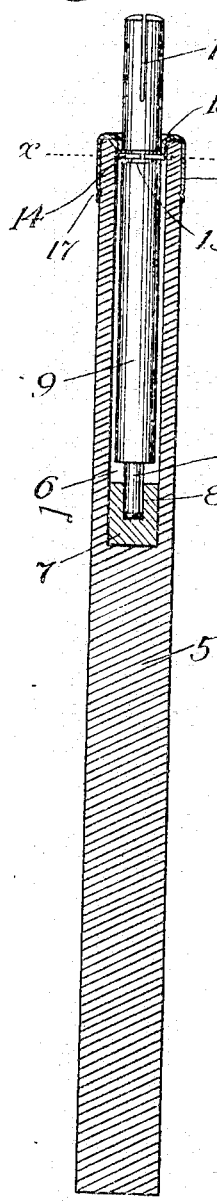
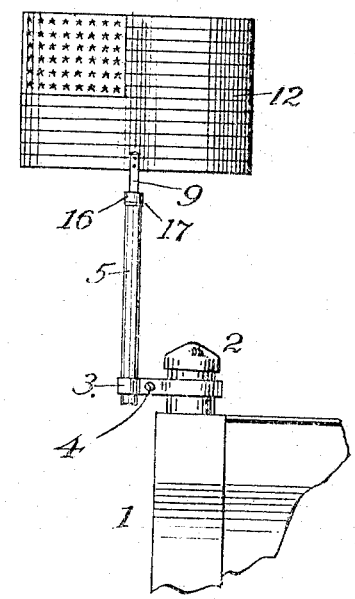
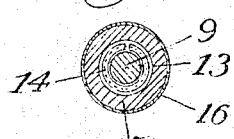
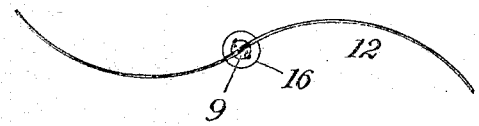
Inventor:
Edwin L. Dodson,
by John Elias Jones,
his attorney.

UNITED STATES PATENT OFFICE.

EDWIN L. DODSON, OF COVINGTON, KENTUCKY.

ROTARY DISPLAY DEVICE FOR AUTOMOBILES AND THE LIKE.

1,258,541.     Specification of Letters Patent.     Patented Mar. 5, 1918.

Application filed October 1, 1917. Serial No. 194,173.

*To all whom it may concern:*

Be it known that I, EDWIN L. DODSON, a citizen of the United States of America, and a resident of Covington, in the county of Kenton and State of Kentucky, have invented a certain new and useful Improvement in Rotary Display Devices for Automobiles and the like, of which the following is a specification.

This invention relates to whirligigs and like rotary devices that are whirled by the wind or by the passing of a moving vehicle. on which they are each mounted, through the air, along the streets or the highways, or the like, for use in displaying various advertisements or parts of same or of symbols of various kinds that become complete as they spin around and thereby attract the eye of the passer-by and others of the observing public likely to be interested therein.

The present invention herein consists of a device especially adapted for use on the customary upright capped-tube at the fore end of the radiator of an automobile whereby a whirling metallic emblem or flag-symbol may be displayed so as to impart the appearance of a floating flag, waving in the wind, or as it would appear if waving from a mast or staff elevated above the ground where it might catch the breeze.

The details of structure of the device will be fully hereinafter described and then clearly and particularly pointed out in the claim that follows.

In the accompanying sheet of drawings,—

Figure 1 is an elevation of my improved device removably-clamped in place at the fore end of a fragmentary portion of the radiator of an automobile, to which latter purpose it is especially adapted, although not essentially, and mostly intended for use by me; Fig. 2, a vertical section of the detachable staff or support for the whirler, omitting the whirler itself and the clamp, as well as said fore end of the automobile member; Fig. 3, a horizontal section taken on the dotted line $x$, $x$, of Fig. 2; and Fig. 4, a plan of the whirler and its supporting-staff, but again omitting the said clamp and radiator-member.

1 indicates the fore end of an automobile radiator-member having the customary capped cooling-fluid inlet-nipple 2.

3 is a clamp composed of a pair of corresponding members, each having a small semicircle and a large semicircle and both united by means of a screw-bolt 4, the large alined semicircles clasping the inlet-nipple 2 and the small alined semicircles clasping the lower end of a perpendicular staff 5, of wood or other suitable material, and said screw-bolt, or a pair of the latter if desired, being used to tightly hold the two members of the clamp in firm relation with said staff and inlet-nipple, the staff being extended upwardly and having in its upper end a deep socket 6 in the bottom of which is seated or pitted a metallic block or jewel 7 that, in turn. is also provided with a pit 8.

9 indicates a vertical stem or spindle having a reduced portion or pivot 10 at its lower end to seat freely in the said pit 8, the lower end of such pivot 10 being preferably rounded or hemispherical for reducing the friction thereof to a minimum, although a supply of lubricating oil may also be used in the pit 8, as a matter of course.

The upper end of the stem 9 extends above the mouth of the socket 6 and is slitted or split, as shown at 11 to accommodate the riveted central part of the lower edge of a sheet-metal whirler 12, the latter being in the nature of a representation of a waving emblem or flag, in this instance that of the American flag, wherein the blue field thereof is not in alinement on both sides of the plate 12, but at both ends thereof, so that as the plate whirls the unalined representations of the flag appear to blend and assume the appearance of a waving flag, flying in a stiff breeze, and the plate 12 being of metal will not fray out or the weather conditions affect it as would result with a real textile flag fluttering or flying in the wind and at the mercy of the elements if used at the fore end of a speeding vehicle where it would be subject to frequent replacement and not stand the wear.

The whirler and stem are connected together by means of rivets or the like and rotate together, the stem forming the pivotal part of the whirler, and the socketed member 5 forming the staff proper of the device. The whirler, in this instance too, is made S-shape longitudinally, whereby the active wave effect to the flag display is imparted thereto and the said blue field with its galaxy of stars is seen at its proper place to the left of the person viewing the display at either side of the machine or vehicle.

A circumferential groove 13 is made in the spindle 9 below the slit 11, and a split ring 14 is inserted in that groove, and of sufficient resiliency to cause it to expand beyond the periphery of the spindle, as best shown in Fig. 2, but it is loosely mounted on the spindle within the groove so as to freely contract when the spindle is inserted in operative position in the socket 6 and then permitted to automatically expand or seat under the lower edge of the downwardly-turned flange 15 of a ring or ferrule 16 that caps the upper or outer end of the staff 5. Thus the spindle 9 is held free to turn in, but not to escape from the socket 6 and the lower edge of the ferrule 16 is creased or dented, as shown at 17 to prevent its accidental displacement from the staff. The upper end of the staff is inwardly beveled to accommodate the downwardly-flanged mouth of the ferrule 16, also as best shown in Fig. 2.

Other forms of whirler can, of course, be substituted for or used instead of the flag conceit shown in Fig. 1. The device can be readily attached or removed as occasion may require.

I claim:—

A rotary display device or whirligig comprising a whirler-image, a pivotal stem or spindle attached to said whirler-image, a circumferential groove in the stem near its upper end and a pivotal point at its lower end, a split resilient coupling or detaining ring in said groove, a staff having a socket in its upper end to accommodate said stem or spindle for support and rotation, and a ferrule on the upper end of said staff having a downwardly-turned flange for engagement by said split ring and to prevent the escape of the stem or spindle from the socket and a crease or dent made in the ferrule to engage the periphery of the staff and prevent its displacement therefrom.

EDWIN L. DODSON.

Copies of this patent may be obtained for five cents each, by addressing the "Commissioner of Patents, Washington, D. C."